Patented Aug. 8, 1933

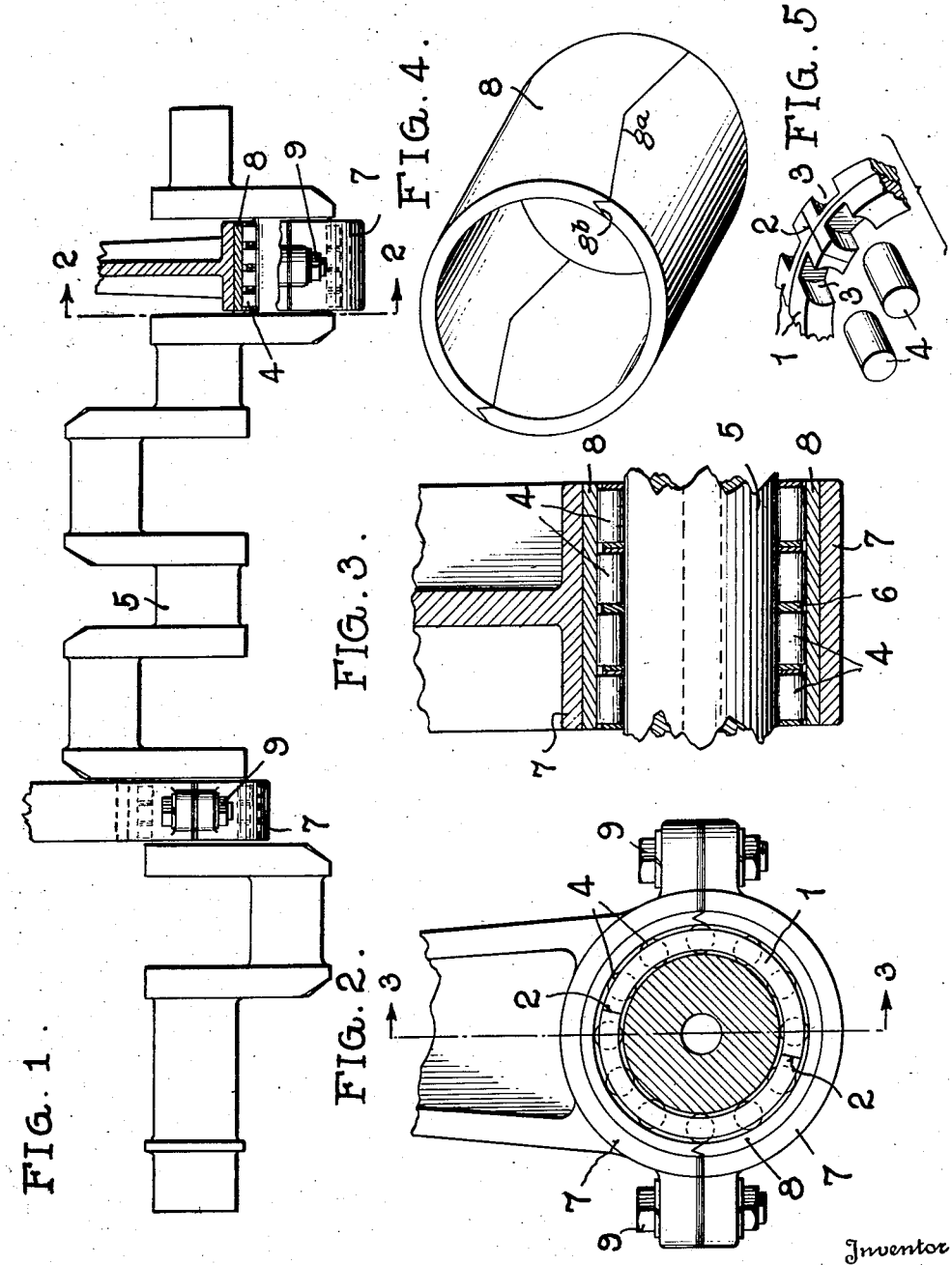

1,921,488

UNITED STATES PATENT OFFICE 1,921,488

BEARING

Thomas Noah Smith, San Antonio, Tex.

Application September 3, 1932. Serial No. 631,699

2 Claims. (Cl. 308—179)

This invention relates to bearings and has particular reference to roller bearings.

The primary object of the present invention is to provide a particularly simple and inexpensive form of roller bearing which shall be highly efficient in operation, and while capable of general use, the present invention is designed particularly for use in connection with internal combustion engines.

Another object is to provide a bearing of this character which shall be composed of a plurality of sections so that a complete bearing of any desired width may be assembled.

With the foregoing and other objects in view, the invention may be stated to consist in the various novel features of construction and arrangement or combination, all of which will be fully described hereinafter and pointed out in the appended claims.

In the drawing accompanying and forming a part of this application:

Fig. 1 is a side elevation of an engine crank shaft showing my improved bearing in use as a main bearing and as a connecting rod bearing;

Fig. 2 is a vertical sectional view taken on the line 2—2 of Fig. 1;

Fig. 3 is a similar view taken on the line 3—3 of Fig. 2;

Fig. 4 is a perspective view of the bearing race; and

Fig. 5 is a detail fragmentary perspective view of the roller retainers with the rollers removed therefrom.

A bearing constructed in accordance with my invention comprises one or more annular roller retainers 1 which are preferably divided diametrically as indicated at 2 for convenience in assembly. Each retainer is recessed at a plurality of points as indicated at 3 for the reception of cylindrical rollers 4 which are of a diameter greater than the radial depth of the retainers 1. In this manner the rollers project beyond the inner and outer circumferential surfaces of the retainers.

A bearing is assembled by placing two semi-cylindrical retainers about the crank shaft 5 and then welding them together and similarly additional pairs of retainers are placed in position and welded along the line of division 2. Adjacent pairs of retainers are preferably placed with the closed ends of the recesses 3 abutting each other as shown in Fig. 5 to prevent the ends of adjacent rollers contacting with each other. The next pair of retainers are assembled in a similar manner and in order to prevent contact of the rollers between adjacent pairs of retainers, a diametrically divided washer or spacer 6 is positioned between the open ends of the roller recesses 3 and the abutting ends of this spacer are welded together. In this manner a bearing of the desired width is assembled on the bearing portion of the crank shaft.

The divided halves 7—7 of the main or connecting rod bearing are then assembled about the roller bearing and preferably a diametrically divided raceway 8 is interposed between the rollers and the main or connecting rod bearing halves so as to receive the wear incident to use and provide easily replaceable elements. The two halves 7—7 of the bearing are secured together by bolts 9 in the usual or any approved manner.

It will be noted by referring to Fig. 4 of the drawing that the raceway 8 is diametrically divided along a broken line, that is one-half of the raceway is formed with a triangular projection, 8ª as viewed in side elevation and the other half of the raceway is formed with a complementary edge portion having a pair of projections adapted to fit on either side of the projection on the adjacent edge of the other section. This arrangement serves to align the two halves of the raceway longitudinally when assembled. It will also be noted that one-half of the raceway is formed with a triangular tongue 8ᵇ as viewed in cross section or end elevation and the other half of the raceway is formed with a cooperating recessed edge portion. This arrangement serves to align the two halves of the raceway transversely.

The foregoing provides a simple and inexpensive bearing for use both as the main bearings and connecting rod bearings for the crank shaft of an internal combustion engine. Where the bearing can be assembled over the end of a shaft it will be obvious that it will be unnecessary to diametrically divide the retainers and thus the bearing may be assembled without welding.

What I claim is:

1. A bearing of the character set forth comprising a plurality of bearing elements and a raceway surrounding said elements, said raceway being divided diametrically and having interengaging edges to align the halves of said raceway longitudinally and transversely.

2. A bearing of the character set forth comprising a plurality of bearing elements and a raceway surrounding said elements said raceway consisting of a pair of substantially semi-cylindrical sections, interfitting at their edges, each edge of one of said sections being provided with a pair of projections between which a complementary projection on the adjacent edge of the other section fits to prevent relative longitudinal movement of the two sections, and each edge of said first mentioned section having a longitudinally extending groove into which a complementary tongue on the adjacent edge of said second edge is adapted to fit to prevent transverse relative movement of said sections.

THOMAS NOAH SMITH.